Aug. 30, 1938.  S. G. MARGLES  2,128,310
MOVING STAIRWAY
Filed March 30, 1937   2 Sheets-Sheet 1
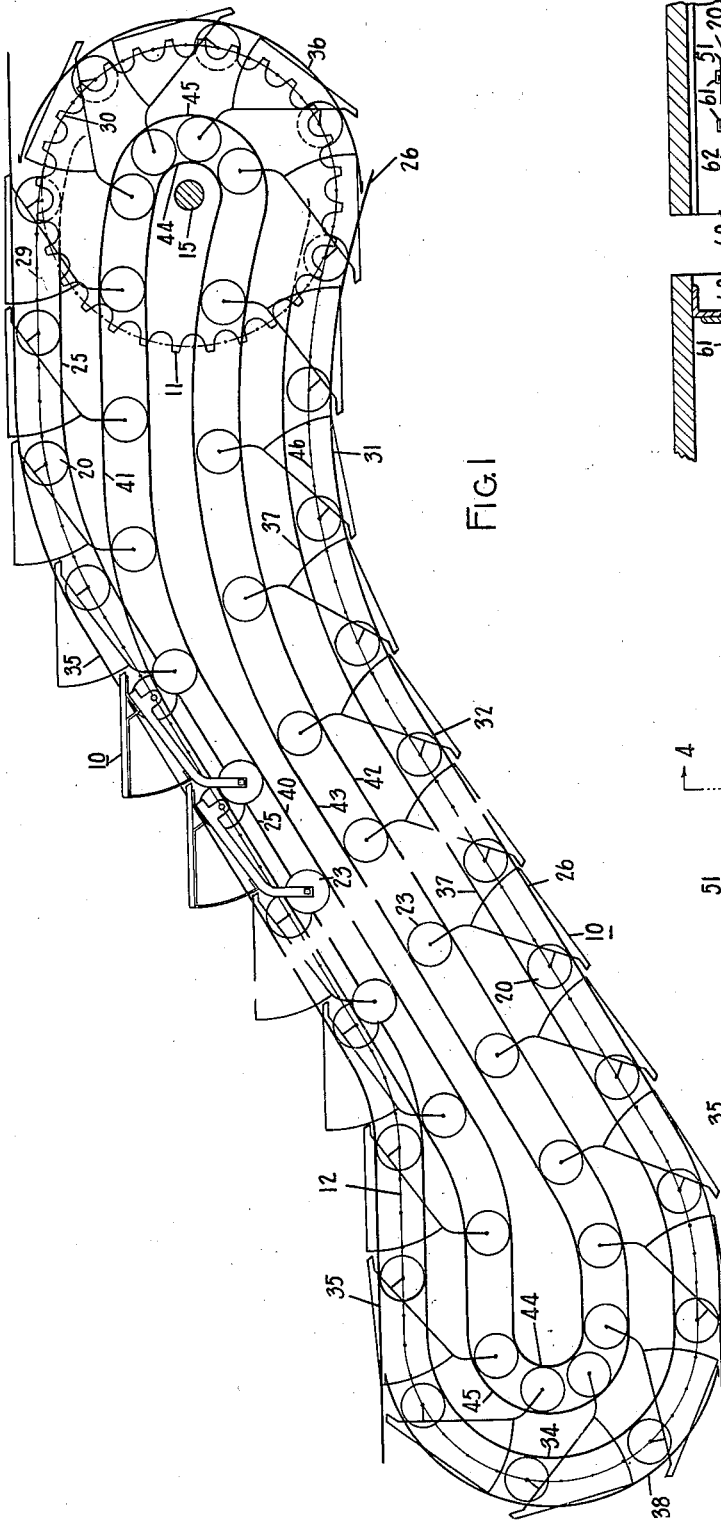
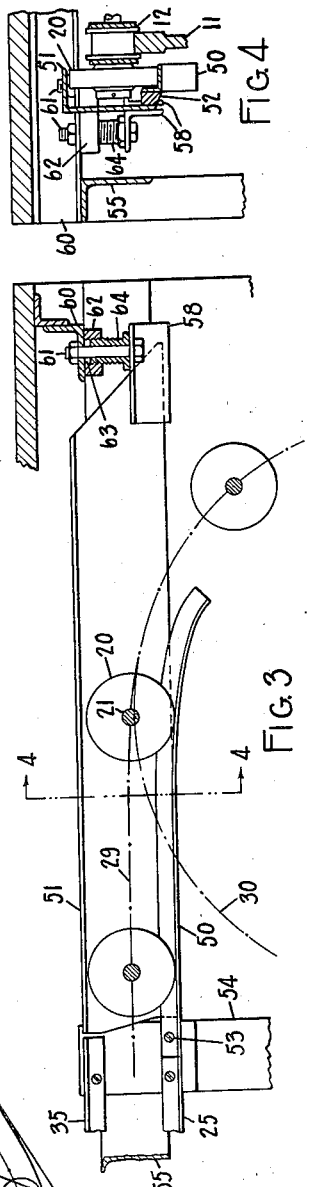
Samuel Gustav Margles
INVENTOR
BY ...
ATTORNEY

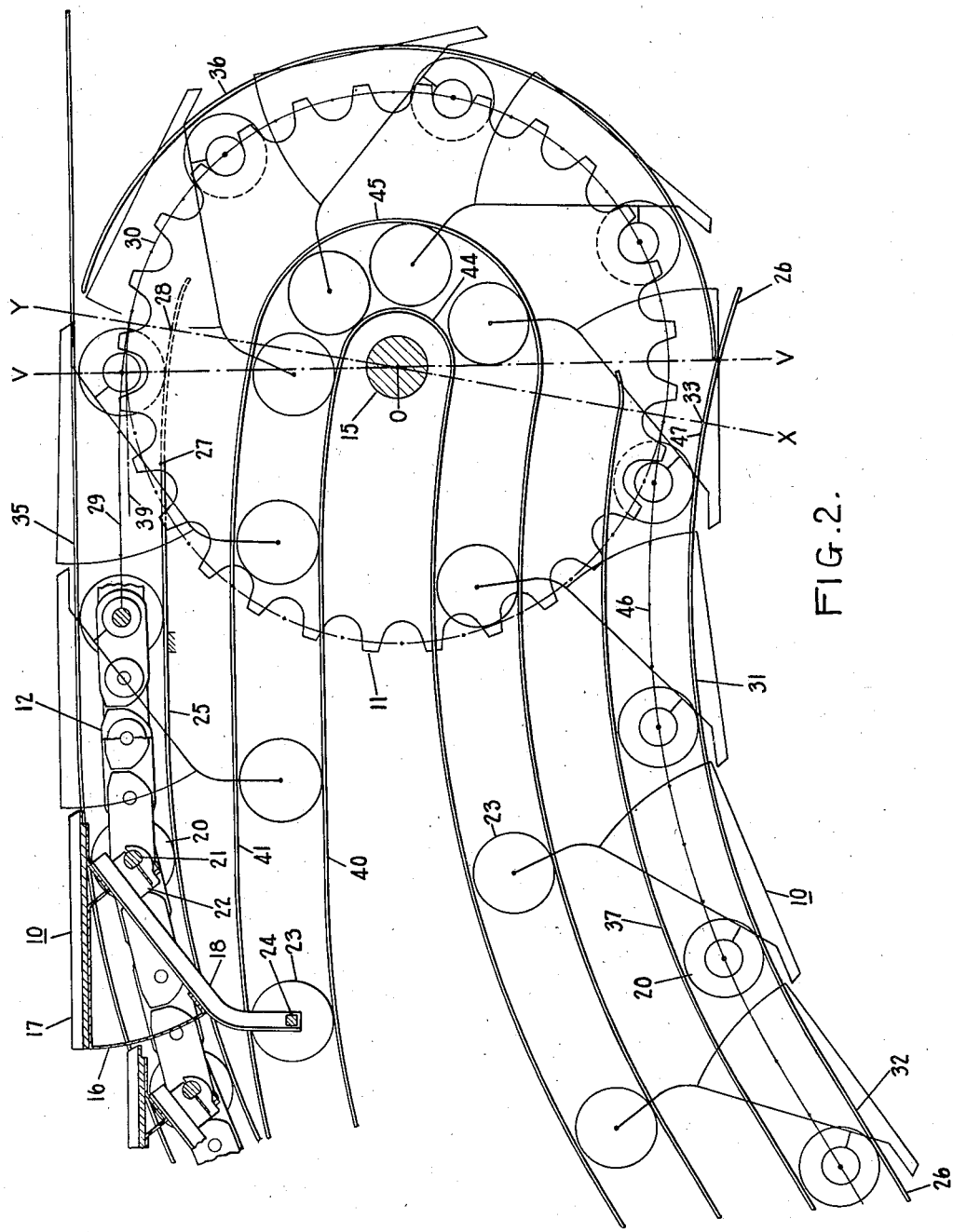

Patented Aug. 30, 1938

2,128,310

UNITED STATES PATENT OFFICE 2,128,310

MOVING STAIRWAY

Samuel Gustave Margles, Brooklyn, N. Y., assignor to Otis Elevator Company, New York, N. Y., a corporation of New Jersey Application March 30, 1937, Serial No. 133,771

7 Claims. (Cl. 198—16)

The invention relates to moving stairways.

Moving stairways comprise an endless series of steps which are moved from one landing to another for the purpose of conveying passengers. The steps are connected together by means of sprocket chain, known as running gear chain. It has been the practice for a considerable number of years to provide a running gear chain on each side of the stairway and to drive these chains by means of sprocket wheels at the upper end of the stairway. Each step is provided on each side with a chain wheel associated with the running gear chain. Sprocket wheels may be provided at the lower end of the stairway for the chains to carry the steps around the bend or curved tracks may be provided for the chain wheels. It is desirable that moving stairways operate as smoothly and noiselessly as possible. Many improvements have been made with the view of aiding in accomplishing this purpose. The steps are supported by tracks for the chain wheels as they come up to the sprocket wheels at the end of the stairway. Also, the chain wheels pass onto tracks to support the steps as the chains leave the sprocket wheels after the steps have passed around the bend. One of the problems has been to provide a moving stairway construction in which the transition of the support of the steps from chain wheel tracks to the sprocket wheels and from the sprocket wheels to chain wheel tracks is effected smoothly and with a minimum of noise as the steps pass around the bend at the end of the stairway, and to maintain such operation after wear of the chain wheels has taken place.

One object of the invention is to eliminate noise incident to the transfer of the support of the steps from the upper run chain wheel tracks to the sprocket wheels as the steps start to pass around the bend when the stairway is moving in one direction and from the sprocket wheels to the tracks when the stairway is moving in the other direction.

Another object of the invention is to eliminate noise incident to the transfer of the support of the steps from the sprocket wheels to the return run chain wheel tracks after the steps have passed around the bend when the stairway is moving in one direction and from the tracks to the wheels when the stairway is moving in the other direction.

The invention will be described as applied to a moving stairway construction in which driving sprockets for the chains are provided at the upper end of the stairway with the steps supported by the chain wheels on curved tracks as they pass around the bend at the lower end of the stairway.

As to the transition of the support of the steps at the top of the upper end of the stairway, the invention is applied to a stairway construction in which the chain wheels are outside the links of the running gear chains, and is carried out by extending the horizontal portion of each of the upper run chain wheel tracks up to a certain point on the incline side of a vertical line through the center of the sprocket wheel and at such height that the axis of each of the chain wheels along this portion of the track is above a horizontal tangent to the pitch circle of the sprocket wheel and by sloping the track gradually downwardly from such point past this vertical center in such way that the line of travel of the axes of the chain wheels and the pitch circle of the sprocket wheel merge at a point on the bend. Thus, in the case of an ascending stairway, the transition of the support of the step from the chain wheel tracks to the sprockets is effected gradually, the chain wheel rollers not fully seating on the sprocket wheels until after the chain wheels have passed a certain distance beyond the vertical center of the sprockets. In the case of a descending stairway, the transition from the wheels to the tracks is also effected gradually, the lifting of the chain wheel rollers from the sprockets beginning a certain distance ahead of this vertical center. Thus these transitions are effected gradually and with a minimum of noise for an extended period of time, wear of the chain wheels simply resulting in a recession toward the vertical center of the sprocket wheel of the point at which the chain wheel rollers seat on or lift from the sprocket wheels.

As to the transition of the support of the steps at the bottom of the upper end of the stairway, the invention is carried out by arranging each of the return run chain wheel tracks between the incline and the sprocket on a curve, the direction of curvature of which is opposite to that of the pitch circle of the sprocket wheel. The curvature is such that the transition of the support of the step is effected gradually and that a downward force is exerted on each chain wheel to maintain it on the track after its chain roller leaves the sprocket in the case of an ascending stairway or until it engages the sprocket in the case of a descending stairway, so that the transition is made with a minimum of noise.

Features and advantages of the invention will be apparent from the following description and appended claims.

In the drawings:

Figure 1 is a diagrammatic representation in side elevation of a moving stairway embodying the invention;

Figure 2 is an enlarged view in vertical section illustrating one side of the stairway shown in Figure 1 at the upper end thereof, parts being shown diagrammatically;

Figure 3 is a side view of the mechanism for adjusting the upper run chain wheel tracks at the upper end of the stairway; and Figure 4 is a section taken along the line 4—4 of Figure 3.

The stairway illustrated is of a present day commercial construction. It comprises an endless series of steps 10 driven at the upper end of the stairway by means of sprocket wheels through running gear chains, a sprocket wheel and chain being arranged on each side of the stairway. A sprocket wheel 11 and running gear chain 12 are illustrated for one side of the stairway. The sprocket wheels are mounted on and driven by the main drive shaft 15, driven in turn by driving mechanism (not shown).

Each step comprises a step frame 16 upon which the tread 17 is mounted. The frame is mounted on brackets 18, one on each side of the stairway. The chain wheels 20 for the step are mounted on an axle 21 extending across the stairway through opposite chain rollers in the running gear chains, the chain wheels being outside the links of the running gear chains. The axle extends into axle blocks 22 secured to one end of step bracket 18 at each side of the stairway. The axle blocks clamp the axle against rotation, the axle being preferably flattened at this point to aid in preventing its turning. Each of the trailer wheels 23 for the step is mounted on an axle 24 supported by the other end of the step bracket 18.

An upper run track 25 and a return run track 26 are provided on each side of the stairway for the chain wheels. The chain wheels are illustrated as passing around the bend at the lower end of the stairway on curved end tracks 34. At the upper end of the stairway, each upper run track extends beyond the main drive shaft partially around the bend. The track is horizontal up to a point 27 to cause the step to be flat as it meshes with or emerges from the comb plate and is of such height as to cause the axes of the chain wheels along this horizontal portion of the track, the line of travel of which is indicated by the line 29, to be above a horizontal tangent 39 to the pitch circle 30 of the sprocket wheel. From this point on, the track extends gradually downwardly to a point 28 at such distance beyond a vertical line v—v through the center of the main drive shaft that the line 29 of travel of the axes of the chain wheels on the track and the pitch circle 30 of the sprocket wheel merge on the radial line o—y extending from the center of the main drive shaft through point 28. The track terminates a short distance beyond this point, being flared at its end. The portion of the track between the points 27 and 28 is preferably the arc of a circle of long radius swung from a point beneath the stairway with the center so located that the line of travel of the axes of the chain wheels on that portion of the track is tangent at one end to the pitch circle 30 and at the other end to the horizontal part of line 29.

Each of the return run tracks 26, in the construction illustrated, extends from the sprocket wheel on a curve 31, the direction of curvature of which is opposite to that of the pitch circle 30 of the sprocket wheel, into the incline portion 32 of the return run track. Although the curved portion 31 of the track may be of other curvatures and other variations in the arrangements may be made, a suitable arrangement is had by swinging the curve on an arc of a circle of long radius. The center of the curve is chosen so that the incline portion 32 of the track is tangent to the curve at one end and at its other end the curve is tangent to an arc of a circle swung about the center of the main drive shaft. The point 33 of common tangency is on the incline side of vertical line v—v through the center of the main drive shaft, being on the line o—x through the center of the main drive shaft and normal to the curve and at a distance from the center of the main drive shaft to provide a slight operating clearance for the chain wheels.

An up thrust track 35 is provided on each side of the stairway for the chain wheels on the upper run. An out thrust track 36 is provided on each side of the stairway for the chain wheels as they pass around the bend at the upper end. The out thrust tracks are concentric with the sprocket wheels. An up thrust track 37 is provided on each side of the stairway for the chain wheels on their return run. An out thrust track 38 is provided on each side of the stairway for the chain wheels as they pass around the bend at the lower end of the stairway. Each of the thrust tracks provides a small clearance for operation of the chain wheels.

The track system for the trailer wheels on each side of the stairway comprises an upper run track 40 having an up thrust track 41, a return track 42 having an up thrust track 43, and an inner curved track 44 and outer curved track 45 at each end of the stairway for guiding the trailer wheels around the bends. The tracks are positioned and shaped to give the proper position to the steps at the various points in their travel.

In the case of an ascending stairway, the chain wheels run on their upper run tracks as they arrive at the upper end of the stairway, remaining on these tracks until the point 28 is reached. As this position is reached, the rollers in the running gear chains through which the chain wheel axle extends mesh with the sprocket wheels 11. With such construction, the steps are supported by the tracks up to this point and the transition of this support to the sprocket wheels is effected gradually, noise incident to the meshing of the chain wheel rollers with the sprockets being eliminated. Thereafter the sprocket wheels carry the step around the bend to the point where the chain wheels run onto their return run tracks.

Each chain wheel on each side of the stairway remains in mesh with the sprocket wheel as the step passes around the bend until the axis of the chain wheel, the axis of the next succeeding chain roller and the axis of the chain wheel next ahead assume a straight line. The point at which this occurs is determined by the radius of curvature of the arcuate line 46 of travel of the axes of the chain wheels on curve 31. This radius may be the number of links in the running gear chain between chain wheels times the pitch radius of the sprocket wheel. With such construction, the straight line condition would occur as the axis of the chain wheel reaches the line o—x, or in other words when the chain wheel reaches the point 33 of common tangency. This is due to the fact that, after the axis of the chain wheel passes the vertical line v—v through the center of the sprocket wheel, the pull on the chain, in maintaining the following chain roller in mesh with its sprocket, raises the chain wheel until this straight line condition is reached. After the straight line condition has been reached, the chain wheel roller starts to leave the sprocket and as further movement of the chain takes place, the chain wheel is gradually transferred to the return track, this taking place at the point 47. From this point on, the chain wheel is maintained on the return track, the curvature of the curved track portion 31 being such as to cause the pull on the chain to exert sufficient downward force on the wheel to hold it on the track.

The radius of curve 31 may be made larger than above indicated so long as sufficient downward force is maintained to keep the chain wheels from leaving the track once the transition is made. A larger radius of curvature is preferred as it has the advantage of a more gradual transition between the wheel and the track and in certain constructions gives better operating clearances. With a larger radius of curvature, the straight line condition is assumed before the chain wheel reaches the point 33 of common tangency. With an arrangement such as above described for effecting the transition of the chain wheels to the return run tracks, the steps are supported by the sprocket wheels in passing around the bend until after the chain wheels pass a vertical plane through the main drive shaft and are thereafter gradually transferred to the return run tracks. Once the chain wheels engage these tracks, they are maintained thereon so that a gradual and yet positive transition is made, noise incident to the transition being eliminated.

The reverse of the above described operations take place in the case of a descending stairway. Each of the chain wheels is maintained on the return run track until the point 47 is reached. Thereafter it gradually leaves the track and when the straight line condition is assumed, the chain roller through which the chain wheel axle extends meshes with the sprocket. Thereafter the sprockets carry the steps around the bend until the point 28 is reached, where the chain wheels engage the upper run tracks 25. Thereafter the chain wheel rollers are gradually lifted off the sprocket wheel. Thus, smooth and noiseless transition is made at the top and bottom of the upper end of the stairway regardless of whether the stairway is an ascending or descending one.

This track construction insures a noiseless transition of the support of the steps to the sprocket wheels from the tracks and from the sprocket wheels to the tracks after wear of the chain wheels takes place. In case of an ascending stairway, as soon as the chain wheels start to wear, the chain rollers through which the chain wheel axle extends mesh with the sprocket wheels sooner in starting around the bend and the chain wheels engage the return run tracks later after having passed around the bend. In other words, the greater the wear on the chain wheels, the sooner the chain rollers mesh with the sprocket wheels at the top and the later the wheels roll onto the return tracks at the bottom. In case of a descending stairway, the reverse is true, that is, the greater the wear on the chain wheels the sooner the chain wheels leave the return run tracks at the bottom and the later the wheels roll onto the upper run tracks at the top.

An adjustment may be provided for the upper run tracks to raise them at their ends, thereby enabling the tracks to be reset after periods of chain wheel wear. An arrangement for effecting this adjustment is illustrated in somewhat simplified form in Figures 3 and 4 for the upper run track on one side of the stairway, the arrangement for the upper run track on the other side of the stairway being the same. In this construction the end portion 50 of the upper run track 25 is secured as by welding to an angle 51 with a suitable elongated spacer 52 between them to provide operating clearance for the chain wheels and axles. This end portion 50 is secured as by a bolt 53 to a bracket 54, in turn secured to a truss angle 55 of the stairway framework. The angle 51 extends beyond the flared end of upper run track 25 and at its outer end has secured thereto a pair of small angles 58, one on each side of the angle. The end of angle 51 is supported by a cross angle 60 extending between truss angle 55 and a corresponding truss angle on the other side of the stairway. This support is effected by means of bolts 61 extending upwardly through angles 58 and cross angle 60. Secured as by welding to the cross angle 60 on the underside thereof is an adjusting block 62 having threaded apertures 63 therein for receiving tubular jack screws 64 through which bolts 61 extend. By moving the end of angle 51 in the proper direction, the outer end of the end portion 50 of upper run track 25 may be set at the desired height, this arrangement being utilized for effecting the proper setting of the track upon the initial installation and for resetting the track after chain wheel wear has taken place.

Assume, for example, that the chain wheels on each side of the stairway have worn to such extent that, in an ascending stairway for example, the point at which the chain wheel rollers mesh with the sprocket wheel on each side of the stairway has moved back near the vertical line v—v through the center of the main drive shaft. By screwing the screw jacks 64 into their sockets in adjusting block 62 and tightening up bolts 61, the outer end of each upper run track is raised to bring the point at which the chain wheel rollers mesh with the sprocket wheels say back to the point 28. This upward movement of the outer end of the track is effected by bending track portion 50 about the point at which it is secured to bracket 54. By arranging the horizontal portion of upper run track on each side of the stairway at a suitable height, an arrangement is provided in which several years would elapse in commercial operation before the wear of the chain wheels would cause the point at which the chain wheel rollers mesh with the sprocket wheel to be near enough to the line v—v for adjustment to be desirable. Thus the adjustments to insure the operation above described would be very infrequent, the track construction itself automatically compensating for the wear which would occur between adjustments.

Although the invention has been described as applied to a moving stairway arrangement in which the chain wheels pass around curved tracks at the lower end of the stairway, it is to be understood that the tracks at the lower end of the stairway may be arranged in accordance with the invention where sprocket wheels are utilized to carry the steps around the bend. Also, it is to be understood that the track arrangements described for the upper end of the stairway may be varied without departing from the invention. The invention may be applied to other forms of moving stairway construction, the form shown being chosen for convenience of illustration. The arrangement of track system for the trailer wheels may be varied, the invention being applicable to various arrangements, including, for example, those shown in the co-pending application of Samuel Gustave Margles and Andrew Fabula, Serial No. 143,652, filed May 20, 1937. The invention is applicable to one way stairways as well as reversible ones.

Therefore, as many apparently widely different embodiments of this invention may be made without departing from the scope thereof, it is intended that all matter contained in the above description or shown in the accompanying drawings shall be interpreted as illustrative and not in a limiting sense.

What is claimed is:

1. A moving stairway comprising; a series of steps; a running gear chain connecting said steps together; a sprocket wheel at an end of the stairway around which said chain passes; a chain wheel for each of said steps; and an upper run track for the chain wheels having an end portion at said end of the stairway, said end portion extending beyond a vertical line through the center of the sprocket wheel to a certain point on the bend, said end portion being of a height at said vertical line to cause the line of travel of the centers of the chain wheel axles to intersect said vertical line above the pitch circle of the sprocket wheel and extending gradually downwardly to said certain point where said line of travel meets said pitch circle.

2. A moving stairway comprising; a series of steps; a running gear chain connecting said steps together; a sprocket wheel at an end of the stairway around which said chain passes; a chain wheel for each of said steps, the axis of which coincides with the axis of a roller of the chain; and an upper run track for the chain wheels having an end portion at said end of the stairway extending from a certain point on the incline side of a vertical line through the center of the sprocket wheel to another point on the other side of said vertical line, said end portion being of a height at said certain point such that the line of travel of the axes of said chain wheels at such point is above a horizontal tangent to the pitch circle of the sprocket wheel and extending gradually downwardly from said certain point to said other point where said line of travel merges with said pitch circle.

3. A moving stairway comprising; a series of steps; a running gear chain connecting said steps together; a sprocket wheel at an end of the stairway around which said chain passes; a chain wheel for each of said steps outside the links of the running gear chain, the axle of each chain wheel passing through a roller of the chain; and an upper run track for the chain wheels having an end portion at said end of the stairway extending from a certain point on the incline side of a vertical line through the center of the sprocket wheel to another point on the other side of said vertical line, said end portion being of such height that the axis of each chain wheel as the wheel reaches said certain point is above a horizontal tangent to the pitch circle of the sprocket wheel at the top of the sprocket wheel and extending gradually downwardly from said certain point on a curve such as to cause the line of travel of said axes of such chain wheel to merge with the pitch circle of the sprocket wheel at a point beyond said vertical line.

4. A moving stairway comprising; a series of steps; a running gear chain connecting said steps together; a driving sprocket at the upper end of the stairway around which said chain passes; a chain wheel for each of said steps outside the links of the running gear chain, the axle of each chain wheel passing through a roller of the chain; an upper run track for the chain wheels having a portion thereof at said end of the stairway horizontal up to a certain point on the incline side of a vertical line through the center of said sprocket and an end portion extending from said point to the other side of said vertical line, said horizontal portion being of such height that, when the chain wheels run thereon, the line of travel of the axes of the chain rollers through which the axles of such chain wheels extend is above a horizontal tangent to the pitch circle of the sprocket at the top of the sprocket and said end portion extending gradually downwardly from said point to cause the line of travel of said axes of such chain rollers to merge with the pitch circle of the sprocket at a point beyond said vertical line; and means for adjustably supporting said end portion of said upper run track.

5. A moving stairway comprising; a series of steps; a running gear chain connecting said steps together; a driving sprocket at the upper end of the stairway around which said chain passes; a chain wheel for each of said steps outside the links of the running gear chain, the axle of each chain wheel passing through a roller of the chain; an upper run track for the chain wheels extending partially around the bend at said end of the stairway, said track having a portion thereof horizontal up to a certain point on the incline side of a vertical line through the center of the sprocket and an end portion extending from said point to the other side of said vertical line, said horizontal portion being of such height that when the chain wheels run thereon, the line of travel of the axes of the chain rollers through which the axles of such chain wheels extend is above a horizontal tangent to the pitch circle of the sprocket at the top of the sprocket and said end portion extending gradually downwardly from said horizontal portion on a curve such that the line of travel of said axes of such chain rollers on said curve is substantially tangent at one end to said line of travel of said axes on said horizontal portion of said track and at the other end to the pitch circle of said sprocket at a point on said other side of said vertical line; and means for adjusting the height of said end portion at said other end thereof.

6. A moving stairway comprising; a series of steps; a running gear chain connecting said steps together; a sprocket wheel at an end of the stairway around which said chain passes; a chain wheel for each of said steps, there being a roller in said chain corresponding to each chain wheel; and a return run track for the chain wheels having a portion which is curved in a direction opposite to that of the pitch circle of said sprocket wheel at the bottom of the sprocket wheel, said curved portion extending from a point beneath said sprocket wheel for a certain distance toward the incline to receive said chain wheels after the corresponding chain rollers leave the sprocket wheel, the highest point of said curved portion being on the incline side of a vertical line through the center of the sprocket wheel and the degree of curvature being such as to maintain each chain wheel on the track once it has engaged the same after the corresponding chain roller has left the sprocket wheel.

7. A moving stairway comprising; a series of steps; a running gear chain connecting said steps together; a driving sprocket at an end of the stairway around which said chain passes; a chain wheel for each of said steps outside the links of the running gear chain, the axle of each chain wheel passing through a roller of the chain; and a return run track for the chain wheels having an inclined portion and a curved portion, the direction of curvature of said curved portion being opposite to that of the pitch circle of said sprocket at the bottom of the sprocket, said curved portion extending from said inclined portion to a line through the center of the sprocket and normal to the line of curvature of the curved portion, the line of curvature of the curved portion being tangent to the line of incline of the inclined portion at the point of joinder of said portions and being also tangent at said normal line to the arc of a circle swung from the center of the sprocket at a radius such as to allow a small clearance for the chain wheels from the track at that point, the radius of curvature of the curved portion being at least the number of links in the chain between adjacent chain wheels times the pitch radius of the sprocket but not greater than that which would cause insufficient downward force to be exerted on each chain wheel to maintain it on the track.

SAMUEL GUSTAVE MARGLES.